Dec. 23, 1958 A. SHORTLAND 2,865,184
ELECTRICAL STARTING AND STOPPING ARRANGEMENTS
FOR KNITTING MACHINES
Filed June 6, 1956 5 Sheets-Sheet 2

United States Patent Office 2,865,184
Patented Dec. 23, 1958

2,865,184

ELECTRICAL STARTING AND STOPPING ARRANGEMENTS FOR KNITTING MACHINES

Arthur Shortland, Leicester, England, assignor to Mellor Bromley & Co. Limited, Leicester, England, a British company Application June 6, 1956, Serial No. 589,696

Claims priority, application Great Britain November 1, 1955

18 Claims. (Cl. 66—157)

This invention relates to starting and stopping arrangements for knitting machines, and may be applied to electrical arrangements in, for example, knitting machines of the kind equipped with electrical stop motion devices operation of any one of which, in the event of the occurrence of a fault, failure or abnormality, effects the switching off of an electric driving motor and the automatic application of a brake adapted to bring the machine rapidly to a stop.

The expression "fault, failure or abnormality" is intended to cover any appropriate emergency condition and includes not only a yarn or thread which is broken, abnormally tensioned or run-out, but also the presence of a knot, slub or like abnormality in a yarn or thread, an abnormality in the knitting itself and even the existence of a misplaced or a broken knitting element in the machine. The electrical stop motion devices which automatically function upon the occurrence of such faults, failures or abnormalities are accordingly in the nature of fault detectors and are of different kinds depending on the particular fault to be detected.

The invention is primarily intended for application to circular knitting machines such, for instance, as multi-feeder body machines of the cylinder and dial type, although there is no limitation in this respect.

Now in an electrically operated knitting machine of the kind concerned, the electrical equipment has heretofore been mechanically operated. Thus, it has been customary to provide a mechanically operable micro-switch for actuating the motor contactor, this switch being operated by a mechanical trip adapted to be manually reset, before the machine could be re-started, by means of a lever. In this case, operation of any of the electrical stop motion devices caused closure of switch means resulting in energisation of a solenoid whereby the mechanical trip was released to effect opening of the motor contactor through the medium of the micro-switch. Interlinked with this trip was an electrically controlled latching device or mechanism by which the brake was held in its normally inoperative, i. e. off, position. This electro-mechanical arrangement was accordingly such that whenever the driving motor was switched off, the said brake latching device or mechanism was automatically released to permit of application of the brake through the medium of mechanical connections. The brake could, therefore, only be taken off and restored to its normal inoperative position by manually re-setting the latching device or mechanism, and this was heretofore effected by means of the aforementioned lever whereby the trip associated with the micro-switch was simultaneously re-set.

An electro-mechanical starting and stopping arrangement of this character is disadvantageous since until the re-setting of the mechanical trip and of the latching device or mechanism has been manually effected by actuation of the lever the machine cannot be started up again. In the case of, say, a large circular knitting machine which stopped automatically as the result of operation of a stop motion device the operator or attendant might be put to the inconvenience of walking right around the machine before he or she could reach the lever.

In the prior arrangement just described the manually operable re-starting lever had necessarily to be located close to the interlinked mechanical trip and latching device. Moreover, when a stop motion device was released or actuated by the occurrence of a fault, failure or abnormality, this device did not, as will be appreciated, operate direct into the main electrical switch box of the machine but only indirectly through mechanical connections; as a consequence time was lost in bringing the machine to a stop in an emergency.

An object of the present invention is to provide, in a knitting machine, an improved and simplified starting and stopping arrangement which is wholly electrical, i. e. devoid of mechanical trips and latches.

An aim is to provide such an arrangement which will not only bring the machine more quickly to a stop in an emergency than was heretofore possible, but will enable "start," "stop," "inch" and "retain" switches to be actuated from any one of a plurality of stations, preferably by means of a common switch-actuating member, thereby providing for a greater measure of control over the machine.

The improved electrical starting and stoping arrangement constituting this invention comprises, in combination, an electric motor for driving the knitting machine, a contactor with an operating coil whereby mains current to the said motor is switched on and off, a stop motion relay arranged in circuit with the stop motion devices (fault detectors), a current-responsive device through the agency of which the brake of the machine is both applied and released, the said stop motion relay embodying a changeover element which is movable from one position to another to make the circuit incorporating the operating coil of the motor contactor and break the circuit of the aforesaid current-responsive device, or vice versa, a time switch which is included in the last mentioned circuit and is adapted to open the same automatically and thereby effect release of the brake after the expiration of a short period of time from the instant of application thereof, "start," "stop," "inch" and "retain" switches incorporated in the arrangement, and means enabling the said switches to be operated as required at the will of the attendant of the machine and according as to whether the machine is to be started, stopped or "inched."

It is within the scope of the invention to provide push buttons for starting, stopping and inching the machine. Such buttons may be provided at any convenient station or stations on, or separate from, the machine. Thus, if necessary or desirable, the machine may be remotely controlled. Or a plurality of groups of push buttons may be provided, according to requirements. Again, there may be a single start button, a single stop button and a plurality of inch buttons distributed around the machine for the convenience of the operator.

Preferably, however, there is provided a common switch-actuating member which is readily movable to different positions, at the will of the attendant of the machine, for operating the aforementioned switches as required.

The provision of a common switch-actuating member is an important feature of the invention since, by making this member of such length as to extend over a substantial distance either adjacent to or remote from the machine, actuation of any desired one of the switches can be effected from any one of a number of stations within the range of the said member. Thus, if, as is principally the intention, the common switch-actuating member is itself mounted upon, and is arranged to extend either around or along the knitting machine (depending as to whether this is a circular machine or a flat or straight bar machine), then the attendant can readily start, stop or inch the machine from any position adjacent thereto. This obviates the necessity for the attendant to leave a part of the machine to which attention is being given, and walk to another station before a desired switch can be actuated. As will be appreciated, this is a great advantage in the case of a large circular knitting machine.

The common switch-actuating member may advantageously be manually operable, for which purpose it may be of such a form as to be easily grasped in the hand and shifted either rightwards or leftwards. The said member may itself be furnished with suitably spaced cams, cam faces or equivalent for actuating switches. Or the member may be adapted for action, either directly or indirectly, upon switch-actuating plungers or the like akin to buttons. Preferably, however, the common switch-actuating member is provided with a switch control section provided with operating cams arranged for action upon biased components furnished with the cams for action upon the switches.

In any event, the common switch-actuating member may conveniently be under the influence of spring means whereby the said member, whenever it is released, is automatically returned to a neutral position at which the "retain" switch is held closed.

The aforementioned current-responsive device through the agency of which the brake is both applied and released preferably takes the form of a solenoid (and will herein after for convenience be referred to as such) arranged to operate the brake in a direct manner in contradistinction to indirectly upon release of a latching device or mechanism.

Normally, that is to say with the machine running, the time switch is closed, and energization of the brake solenoid effects application of the brake. Immediately the brake has been applied, the time switch is conditioned to open automatically after a predetermined interval of time with the aforementioned result.

The time interval between application and automatic release of the brake is just sufficient to enable the latter to bring the machine to a complete stop. That is to say, the brake remains on just long enough (e. g. anything up to 5 seconds) to stop the machine but is thereupon immediately released in any entirely automatic fashion to permit the machine to be started up again after the stoppage, without any mechanical re-setting of the brake being necessary.

With regard to the time switch, this may be arranged to be automatically closed under (or against) spring action whenever the motor contactor is closed, and conditioned to open automatically after the required delay whenever the said contactor is permitted to open.

Whenever the operating coil is energized to close the motor contactor and so re-start the machine after a stoppage, the time switch is as a consequence automatically closed.

With the knitting machine running, the brake will be off, the time switch closed, and the changeover element of the stop motion relay will be so positioned that the circuit of the brake solenoid is open and the contactor operating coil circuit is closed. When, however, the stop motion relay is energized, either at the will of the operator by actuation of the "stop" switch, or automatically upon operation of any one of the electrical stop motion devices, the changeover element moves into its alternative position with the result that (a) the circuit of the operating coil is broken to release the contactor which thereupon opens to switch off the current to the motor and (b) the circuit of the brake solenoid is closed to apply the brake and condition the time switch to open automatically after the aforementioned predetermined interval of time.

In the improved arrangement, actuation of the "start" switch, to start up or re-start the knitting machine at will, permits of energization of the motor contactor operating coil and as a consequence also effects movement of a hold-on switch to bridge contacts whereby the connection of the appropriate side of the operating coil with earth, via the aforementioned "retain" switch, is maintained. In this way, even when the closed "start" switch is released and opens, the operating coil circuit remains closed and the motor continues to run.

Since, when inching the machine, the "retain" switch is open and the connection between the appropriate one of the bridged hold-on contacts and earth is thereby broken, it follows that when the "inch" switch is permitted to open closure of the operating coil circuit will not be maintained; the current to the motor is, therefore, immediately switched off again.

Actuation of either the "start" switch or the "inch" switch has no effect, of course, upon the stop motion relay.

The improved arrangement is also such that, if desired, the machine can be stopped and allowed to come to rest gradually, without the brake being applied by closing the "inch" switch.

In order that the invention may be more clearly understood and readily carried into practical effect, a specific example of the improved electrical starting and stopping arrangement as applied to a multi-feeder circular knitting machine of the cylinder and dial type will now be described with reference to the accompanying drawings, wherein.

Like parts are designated by similar reference characters throughout the drawings.

Figure 1:
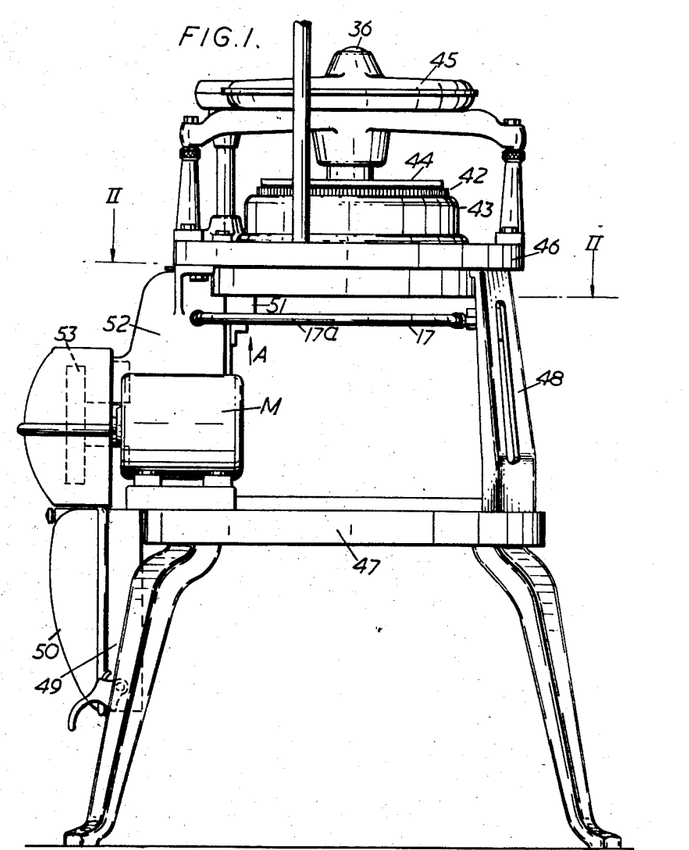
Figure 1 is an elevational view of so much of the said machine as is necessary to illustrate, inter alia, the stop and start control ring and the switch box containing the various micro-switches to be operated from the said ring.
Figure 7:
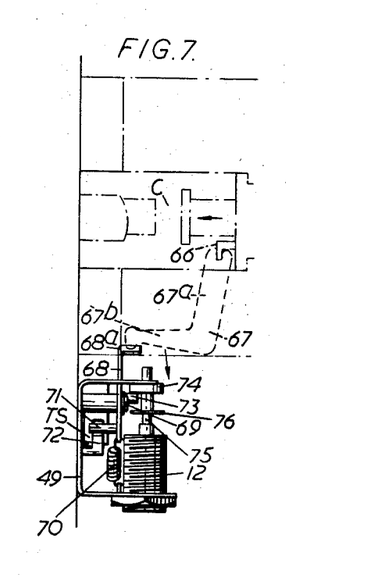
Figure 7 is a side view of the time switch and the dashpot device, and shows the manner in which this switch is closed mechanically by a part associated with the armature of the motor contactor.

Referring to Figure 1, the numeral 42 indicates the rotary needle cylinder of the machine, 43 is the stationary cylinder cam box, and 44 represents the stationary dial cam cap. At 45 is illustrated the conventional gear casing containing gearing whereby the rotary needle dial (not shown) is driven at the same rotational speed as the cylinder 42. The bed plate of the knitting head of the machine is indicated at 46, whilst at 47 is shown a bed ring forming part of the machine framework and serving to support the customary fabric drawing-off or winding-down mechanism. Struts such as 48 mounted upon the bed ring 47 are arranged to support the knitting head bed plate 46. An electric motor M mounted upon the bed ring 47 is provided for driving the knitting machine. A contactor C (Figures 7 and 8) having an operating coil OC and by means of which mains output to the motor M is switched on and off is incorporated in the electrical arrangement. This arrangement also includes a stop motion relay SR (Figure 8) arranged in circuit with fault detectors FD, and a brake solenoid BS through the agency of which the brake of the machine is both applied and released. The stop motion relay SR embodies a changeover switch element CS which is movable from one position to another to make the circuit incorporating the operating coil OC of the motor contactor C and break the circuit of the brake solenoid BS, or vice versa. In the last mentioned circuit is included a time switch TS which is adapted to open the said circuit automatically and thereby effect release of the brake after the expiration of a short period of time from the instant of application thereof. Opening of the time switch TS is controlled by an oil dashpot 12 set to give a delay of anything up to, say, five seconds. Finally, the improved electrical starting and stopping arrangement essentially includes a "start" switch 13, a "retain" switch 14, a "stop" switch 15 and a changeover "inch" switch 16. These four switches, which are of the micro-type, are arranged to be actuated from a common control ring 17 (or control member 17'), see Figure 8.

The motor contactor C, the time switch TS and the oil dashpot 12 combined therewith are all housed in a main switch box 49 (see Figure 1) furnished with a readily releasable hinged cover 50. The four micro-switches 13, 14, 15 and 16, on the other hand, are accommodated in a second switch box 51 which is located beneath the bed plate 46 and is attached to the main drive bracket 52.

Figure 5:
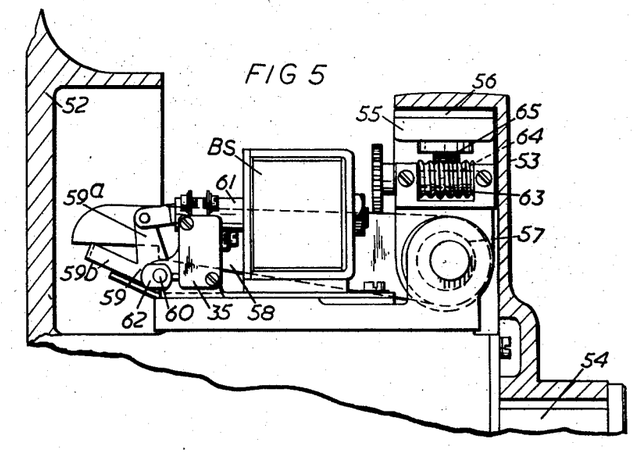
Figure 5 is a part-sectional detail view of the brake drum containing a brake shoe and depicts also the solenoid and the associated connections through the agency of which the brake is both applied and released.

A pulley 53 secured to the main drive shaft 54 and arranged to be driven from the motor M is so fashioned as to be adapted to function also as a brake drum. This drum contains a comparatively short shoe 55 of arcuate form which shoe, as illustrated in Figure 5, is lined at 56 and is mounted upon an eccentric 57 turning movement of which moves the shoe into and out of contact with the interior surface of the drum 53. The eccentric 57 is arranged to be turned by a lever 58. Thus, to apply the brake, the said lever is pressed upwards and thereby turned to a small extent clockwise (as viewed in Figure 5). Conversely, relief of this upward pressure on the lever 58 permits the latter to drop and so effects withdrawal of the lined shoe 55 from contact with the drum 53. For action upon the brake-operating lever 58 there is provided a small two-armed lever 59 which is fulcrummed at 60 and has one of its arms 59a connected to the moving core 61 of the brake solenoid BS. The other arm 59b of the two-armed lever 59 is bent laterally and arranged to act upon the lower edge of the brake-operating lever 58 at a point near to the outer end of the latter. Accordingly whenever the solenoid BS is energised and the moving core 61 is drawn into the winding of the solenoid, the lever 59 will be turned clockwise to apply upward pressure to the lever 58 and so operate the brake. De-energisation of the solenoid BS, by breaking the circuit in which it is incorporated, relieves the upward pressure on the lever 58 and permits the shoe 55 to move away from the wall of the brake drum 53.

At 35 (Figures 5 and 8) is provided a safety switch to ensure that, in the event of the brake failing to come off when the solenoid BS is de-energized, the coil of the stop motion relay SR will be energized so that the machine cannot be re-started. Also, the switch 35 retains stop motion relay SR so long as solenoid BS is energized, thereby increasing the sensitivity of stop motion circuit. As will be seen in Figure 5, the switch 35 may conveniently be actuated by a cam 62 arranged to turn with the lever 59.

The brake shoe 55 is adjustable manually through the medium of worm gearing 63, 64, and a screw 65.

In an alternative construction, a brake shoe or shoes may be mounted on the outside of the pulley or other component to be braked so that when the solenoid is energized the shoe or shoes presses or press radially inwards upon the component. Any other appropriate form of brake may, however, be adopted.

Figure 6:
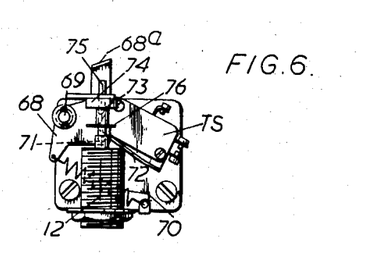
Figure 6 illustrates, in detail, the time switch and a dashpot device combined therewith.

The time switch TS is of the changeover micro-type and is adapted to be acted upon and opened mechanically from a moving part 66 of the motor contactor C (Figure 7), through spring-influenced intermediate connections. Thus, as will be seen in Figures 6 and 7, the moving contactor part 66 is engaged with a forked arm 67a of a bell crank 67 the other arm 67b of which is adapted for action upon a forwardly bent upper portion 68a of a pivoted plate 68. This plate, which fulcrums about a pin 69 fixed in the main switch box 49, is influenced by a tension spring 70 arranged as shown and has secured therein two pins, viz. a rearwardly directed pin 71 disposed for action upon a resilient actuating element 72 of the time switch TS and a forwardly directed pin 73 extending beneath a disc 74 secured upon the piston rod 75 of the oil dashpot 12. The micro time switch TS is so wired that when the resilient element 72 is pressed in, the switch is opened, and vice versa. A second disc 76 is provided on the rod 75 beneath the pin 73. The construction and arrangement are accordingly such that whenever the motor contactor C is closed to switch on the current to the motor M, the bell crank 67 will be turned anti-clockwise (as viewed in Figure 7) so that its arm 67b presses down upon the bent portion 68a of the pivoted plate 68. As a consequence this plate is turned clockwise as viewed in Figure 6, against the action of the spring 70. By virtue of this turning movement, the pin 71 on the plate moves away from the resilient actuating element 72 and permits the timing switch TS to close, and the pin 73 acts on top of the disc 76 to restore the dashpot to its normal loaded condition. On the other hand, whenever the contactor C opens to switch off the current to the motor M, simultaneously with application of the brake, the bell crank 67 turns clockwise, thereby moving its arm 67b upwards away from the portion 68a of the pivoted plate 68 and releasing the latter. The spring 70 thereupon turns the plate anti-clockwise, but because the pin 73 abuts the underside of the disc 74, the turning movement is controlled and delayed by the upwardly moving piston of the dashpot 12. As a result, although the pin 71 acts on and pushes in the resilient actuating element 72 to open the time switch TS, the opening of the latter is delayed for a few seconds after the opening of the motor contactor M.

Instead of an oil dashpot, an air-operated delay device may be employed.

Alternatively the time switch may be of a thermal type including a heater winding arranged in the brake solenoid circuit and designed, by the heat generated, to cause separation of the time switch contacts after the elapse of the predetermined interval of time.

Figure 2:
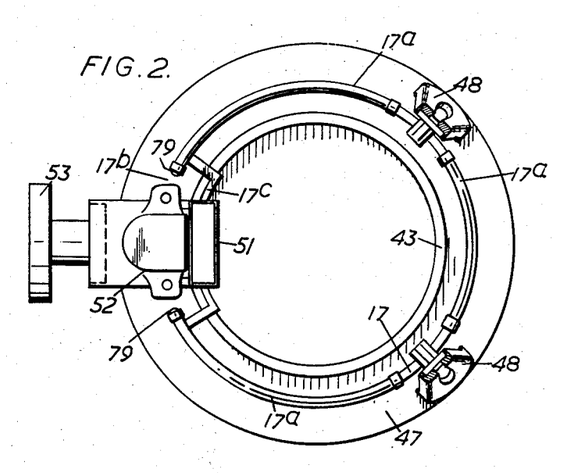
Figure 2 is a part-sectional plan view taken on the line II—II of Figure 1 showing the control ring and the associated switch box.

The common control ring 17, located beneath the bed plate 46, is mounted for turning movement both clockwise and anti-clockwise in bearings or bearing elements carried by the struts 48. To enable it to be turned easily, the said control ring is fitted with hand-grip portions 17a. The continuity of the ring is broken at 17b (see Figure 2), although the gap produced is bridged by a switch control section designated 17c. The arcuate operative portion of this section is on a circle of less diameter than that of the remaining portion of the control ring, and is movable to and fro immediately beneath the switch box 51. As will be seen in Figure 4, moreover, the switch control section 17c is supported upon a subsidiary bracket 77 attached to a main bracket 78 constituting part of the switch box 51. The free ends of the gapped portion of the control ring 17 are provided with rubber stops 79 for contact with the main drive housing 52. The said ring is accordingly in the form of a hand-rail which can, from practically any position around the machine, be grasped in the hand and shifted in either direction to turn the ring either clockwise (i. e. leftwards) or anti-clockwise (rightwards).

Figures 3, 4:
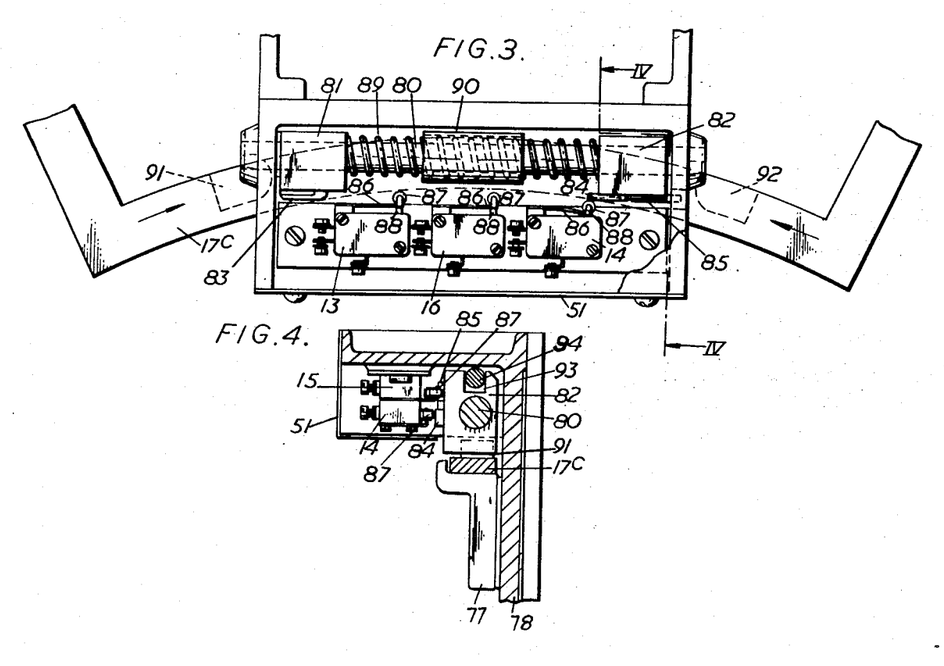
Figure 3 is a detail underside plan view of the switch box as seen in the direction of the arrow A in Figure 1.
Figure 4 is a sectional view of the said switch box taken on the line IV—IV of Figure 3 and shows the superimposed "stop" and "retain" switches hereinafter to be described.

Mounted on and slidable along a horizontally disposed rod 80 fixed with the switch box 51 are two blocks 81 and 82. The left-hand block 81 has provided upon its front face a cam 83 for actuating the "start" switch 13, whereas the corresponding face of the right-hand block 82 carries two superimposed cams 84 and 85 which are relatively offset longitudinally, the cam 84 for actuating the "retain" switch 14 and the cam 85 for actuating both the "stop" switch 15 and the "inch" switch 16. For operating it, each of these micro-switches is provided with a resilient blade 86 furnished at its outer end with a roller 87. Thus, whenever the roller 87 of any one of the switches is acted upon and pressed aside by the relevant switch-actuating cam, the resilient blade 86 functions to press in a plunger 88 and thereby effect closure of the switch. When a cam moves off a roller 87 the corresponding switch opens. As the "stop" switch 15 is disposed immediately above the "retain" switch 14, as shown in Figure 4, then the said "stop" switch is, of course, masked by the "retain" switch in Figure 3. Mounted on the rod 80, and interposed between the opposed faces of the two blocks 81 and 82, is a helical compression spring 89 which normally holds these blocks in the positions shown in Figure 3. The spring 89 extends freely through a tubular abutment 90. The upper face of the switch control section 17c is provided with two cams 91 and 92 for operating the cam bearing blocks 81 and 82 respectively. It should also be noted that, in order to maintain these blocks upright, their upper faces are deeply recessed, as indicated at 93, for engagement with a fixed and horizontally disposed guide rod 94 (see Figure 4).

When the control ring 17 is in the neutral position, the switch control section 17c is disposed as shown in Figure 3, that is to say with the cam 84 in contact with the roller 87 of the "retain" switch 14 and hence with the latter closed. By grasping the control ring 17, from any station around the machine, and turning it anti-clockwise, the cam 91 acts on the left-hand block 81 and pushes it to the right along the rod 80 and against the action of the spring 89. As a consequence the cam 83 functions to close the "start" switch. Upon release of the control ring 17, the block 81 will spring back into its inoperative position thereby pushing the said ring into its neutral position. On the other hand, by shifting the ring 17 one step to the left, the cam 92 will act on the right-hand block 82 and push it along the rod 80 against the action of the same spring 89 with the result that, firstly, the cam 84 will leave the roller 87 of the "retain" switch 14 and permit the latter to open and, secondly, the cam 85 will press aside the roller of and function to close the "stop" switch 15. Continued movement of the ring 17 to the left, i. e. clockwise, causes the block 82 to push the tubular abutment 90 along the spring 89 until such abutment contacts the block 81 and thereby arrests the block 82 with the cam 85 in engagement with the roller 87 of the "inch" switch 16. In this extreme left position of the control ring 17, the "inch" switch 16 is, therefore, closed and the "retain" switch 14 is open. As will be appreciated, by first shifting the control ring to its extreme left position and then moving it alternately rightwards and leftwards to a small extent only, the cam 85 can be caused alternately to open and close the "inch" switch when inching the machine. But whenever the ring 17 is released it will automatically return to the neutral position with the "retain" switch 14 held closed by the cam 84.

Figure 8:
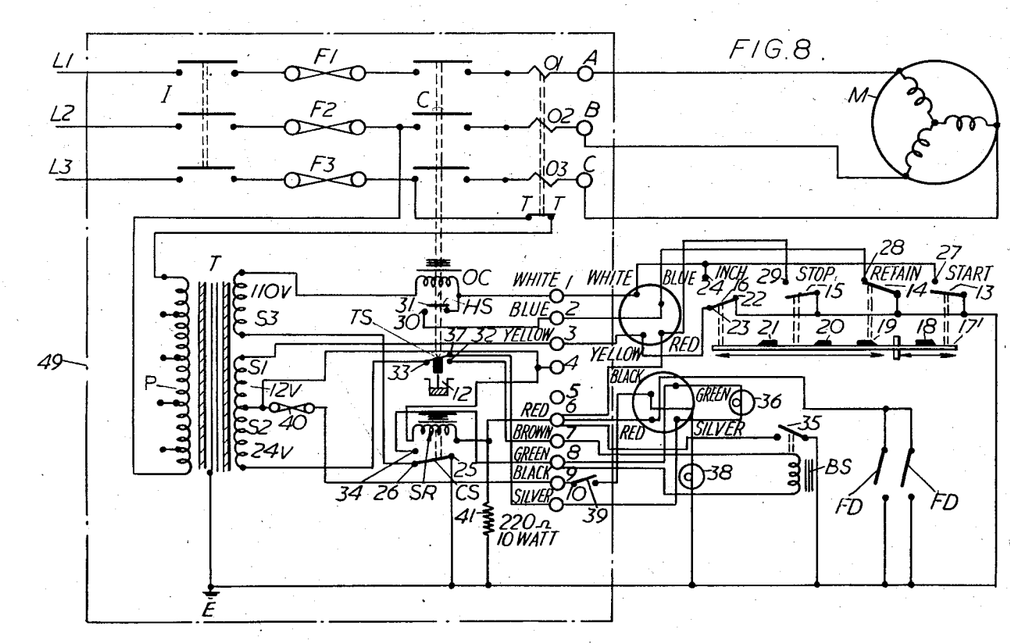
Figure 8 is a diagram illustrating the complete electrical starting and stopping arrangement.

The complete electrical starting and stopping arrangement and its operation will presently be described more fully with reference to Figure 8. But before proceeding with this description it must be explained, with a view to avoiding confusion, that in Figure 8 a slightly different arrangement of the four microswitches 13, 14, 15 and 16 is shown and that, merely for convenience in diagrammatic illustration, cams 18, 19, 20 and 21 for operating these switches are shown as being provided directly upon a common control member 17'. As shown, this member is in its neutral position. Thus, by moving the member to the right the cam 18 will act on and close the "start" switch 13. By moving the member 17 one step to the left, the cam 19 will be shifted from the vicinity of the "retain" switch 14 with the consequence that the latter will open, and at the same time the cam 20 will act to close the "stop" switch 15. A further movement of the said member to the left will permit the "stop" switch 15 to open again (the "retain" switch 14 meanwhile remaining open) and will cause the cam 21 to change over the "inch" switch 16 from a position in which it connects the common terminal 22 with the contact 23 to a position in which it similarly connects the terminal 22 with the contact 24.

Whenever it is released, the control member 17 returns to the neutral position. It will accordingly be appreciated that this diagrammatic arrangement is essentially the same as the constructional arrangement previously described herein.

In Figure 8, it will be seen that the electric driving motor M is a three-phase motor arranged to be fed with mains current from three lines $L^1$, $L^2$ and $L^3$. Incorporated in these lines, and accommodated in the main switch box 49, are a conventional isolator I, three 15 amp. fuses $F^1$, $F^2$ and $F^3$, the motor contactor C and overload devices $O^1$, $O^2$ and $O^3$. Also mounted in the box 49 are a transformer T, the operating coil OC of the motor contactor C, the stop motion relay SR embodying the changeover switch element CS and the time switch TS which latter, as previously described, is incorporated in the circuit of the brake solenoid BS. FD are the switches of fault detectors, i. e. electrical stop motion devices with which the machine is equipped. Although for convenience in illustration only two such switches are shown, it will be understood that, in practice, there would be at least as many fault detectors or groups of the same as there are feeders in the machine.

As will be seen, the primary winding P of the transformer T is fed from the lines $L^2$ and $L^3$ via overload contacts TT. The 12 volt output of the secondary winding $S^1$ of the transformer is for feeding the coil of the stop motion relay SR; the 24 volt output of the secondary winding $S^2$ is for energising the brake solenoid BS; and the 110 volt output of the secondary winding $S^3$ of the transformer is for operating coil OC. One side of this winding $S^3$ is connected directly to the said operating coil, whilst the other side thereof is connected to earth E, whenever the machine is running, via the changeover switch element CS of the relay. The common terminal of this changeover switch element is indicated at 25 and, since it is connected to E, is permanently at earth potential. When the machine is running the switch element CS is in engagement with a relay contact 26, connected to one end of the secondary winding $S^3$, and so serve to maintain the circuit of the operating coil OC closed with the result that this coil is energised to pull down the switch elements of the contactor C into engagement with their respective pairs of contacts and keep the motor circuit closed.

One side of each of the switches 13, 14 and 15 and the common terminal 22 of the changeover "inch" switch 16 are connected to earth E. The contact 27 of the "start" switch 13 and also the contact 24 of the changeover "inch" switch 16 are connected by a white wire to a terminal 1 and, via the latter, to the operating coil OC of the motor contactor C. The contact 28 of the "retain" switch 14 is connected by a blue wire to a terminal 2 and, via this second terminal, to the contact 30 of a hold-on switch HS mounted on the armature of the operating coil OC; the contact 31 of the said switch is connected to the operating coil. The contact 29 of the "stop" switch 15 is connected by means of a red wire and via a terminal 6 to the coil of the stop motion relay SR. The contact 23 of the "inch" switch 16 is connected by means of a yellow wire, and via a terminal 3, to one end of the secondary winding $S^1$ of the transformer T.

One side of the brake solenoid BS is connected to a brown terminal 7 which is in turn connected to one contact 32 of the changeover time switch TS the common terminal 33 of which latter is wired to the 24 volt winding $S^2$. The opposite side of the solenoid BS is connected to a green terminal 8 and, via the latter, to a second relay contact 34 of the stop motion relay SR. There may conveniently also be provided an indicator lamp 36 adapted not only to indicate a failure of the brake in the respect just mentioned but also to indicate that one of the electrical stop motion devices is at fault.

As will be seen, one side of the lamp 36 is wired to the green terminal 8, whilst the other side is connected by a silver wire and via the terminal 10 to the contact 37 of the time switch TS.

If desired, and as shown in the diagram, a lamp 38 together with an associated switch 39 may be incorporated in a circuit arranged to be supplied with current from the 12 volt output winding $S^1$ of the transformer via a block terminal 9. Such a lamp, the circuit of which incorporates a fuse 40, may be used by the operator or a mechanic for illuminating any desired portion of the machine or of the fabric being produced as occasion may demand.

At 41 is provided a 220Ω10 watt resistance across the red terminal 6 and earth, the purpose of this being to eliminate or substantially reduce arcing at the stop motion contacts.

To start up the knitting machine, the isolator I is first closed to connect the three phase mains supply to the electrical starting and stopping arrangement just described, whereupon the control member 17' (or ring 17 in the constructional arrangement) is moved to the right to effect closure of the "start" switch 13. As a consequence, earth potential of winding $S^3$ is put on the white terminal 1 to close the circuit of, and thereby energise, the operating coil OC. The contactor C accordingly closes and the motor M is switched on. Simultaneously with closure of the motor contactor C, the hold-on switch HS is automatically closed onto the contact 30 thereby maintaining the machine in the running condition in which the operating coil OC will remain connected to earth, via the blue terminal 2 and the said "retain" switch notwithstanding opening of the "start" switch 13. During these starting conditions, the changeover switch element CS embodied in the relay SR is in the position shown in the diagram, i. e. in engagement with the relay contact 26. When the member 17 is released it returns to it neutral position.

Assume now that a fault, failure or abnormality occurs: the switch FD of the relevant fault detector (stop motion device) will thereupon close to put an earth potential on the red terminal 6 so that the coil of the stop motion relay SR is energised. As a consequence, the position of the changeover switch element CS of this relay will be transferred from the relay contact 26 to the relay contact 34 with two results; firstly, the circuit of the operating coil OC will be broken so that this coil becomes de-energised and the contactor C is reelased and opens to switch off the current to the motor M and, secondly, the brake solenoid circuit will be closed so that current at 24 volts will be fed to the brown terminal 7 and the brake solenoid BS is energised to effect application of the brake of the machine. Moreover, since by opening of the contactor C the pressure on the time switch TS is relieved, this switch will thereupon move from the contact 32 to the contact 37 after a predetermined interval of about 2 or 3 seconds (determined by the oil dashpot 12) for the purpose of breaking the solenoid circuit again and de-energising BS with the result that the applied brake is permitted to return to its normal "off" position.

To inch the machine, the common control member 17' (or the ring 17) is moved fully to the left to open the "retain" switch 14, and close the "inch" switch 16 by transference of the blade of the latter from the contact 23 to the contact 24. As a consequence, earth potential of the 110 volt transformer winding $S^3$ is applied to the operating coil OC via the white terminal 1 suchwise as to close the contactor C and start up the motor M. But at the same time, and by virtue of the fact that the connection between the terminal 22 and the contact 23 is broken, the transformer winding $S^1$ is isolated to prevent energisation of the coil of the stop motion relay SR. In these circumstances, inching can take plate without applying the brake and with the stop motion at fault position. Isolation of the winding $S^1$ in this way, moreover, is important in that it enables released stop motion devices to be restored to their normal operative positions preparatory to starting up the machine. The machine cannot be started with one of the switches FD closed.

To stop the machine at the will of the operator, the control member 17' (or ring 17) is moved one step to the left thereby causing the blade of "stop" motion switch 15 to make on contact 29, thereby energising stop motion relay SR with the same result as when a stop motion operates.

I claim:

1. In a knitting machine, an electrical starting and stopping arrangement comprising, in combination, an electric driving motor for driving the said machine, a circuit incorporating electrical stop motion devices operation of any one of which, in an emergency, effects the switching off of said motor, a brake operable to bring the machine to a stop when the motor is switched off, a contactor with an operating coil whereby mains current to the said motor is switched on and off, a stop motion relay arranged in circuit with the stop motion devices, a current-responsive device through the agency of which the brake is both applied and released, said stop motion relay embodying a changeover element movable from one position to another to make the circuit incorporating the operating coil of the motor contactor and break the circuit of the aforesaid current-responsive device, or vice versa, a time switch which is included in the last mentioned circuit and is adapted to open the same automatically and thereby effect release of the brake after the expiration of a short period of time from the instant of application thereof, start, stop, inch and retain switches, and means enabling said switches to be operated as required at the will of the attendant of the machine and according as to whether the machine is to be started, stopped or inched.

2. An electrical starting and stopping arrangement according to claim 1, which includes a common switch-actuating member movable to different positions for operating the start, stop, inch and retain switches.

3. An electrical starting and stopping arrangement according to claim 2 which is applied to a circular knitting machine and wherein the common switch-actuating member is mounted upon and extends about the machine, said member being manually operable from any station around the machine and movable either rightwards or leftwards.

4. An electrical starting and stopping arrangement according to claim 3, wherein the common switch-actuating member is provided with operating cams arranged for action upon biassed components furnished with other cams for action upon the said switches.

5. An electrical starting and stopping arrangement according to claim 3, wherein the common switch-actuating member is under the influence of spring means whereby the said member, whenever it is released, is automatically returned to a neutral position at which the retain switch is held closed.

6. An electrical starting and stopping arrangement according to claim 5, wherein by movement of the switch-actuating member in one direction the start switch is closed, whereas by movement of the said member one step in the opposite direction the retain switch opens and the stop switch is closed, and continued movement of the member in the last mentioned direction effects closure of the inch switch with the retain switch still open.

7. In a knitting machine, an electrical starting and stopping arrangement comprising, in combination, an electric driving motor for driving the said machine, a circuit incorporating electrical stop motion devices operation of any one of which, in an emergency, effects the switching off of said motor, a brake operable to bring the machine to a stop when the motor is switched off, said brake comprising a drum containing a brake shoe, an eccentric for action upon said shoe, a lever by means of which said eccentric is turned, a contactor with an operating coil whereby mains current to the said motor is switched on and off, a stop motion relay arranged in circuit with the stop motion devices, a solenoid through the agency of which the brake is both applied and released, said solenoid being adapted, when energized, to apply pressure to the lever suchwise as to move the shoe into contact with the brake drum and effect de-energisation of the solenoid, by breaking the circuit in which it is incorporated, relieving the pressure on the said lever and permitting the shoe to move out of contact with said drum, said stop motion relay embodying a changeover element movable from one position to another to make the circuit incorporating the operating coil of the motor contactor and break the circuit of the aforesaid solenoid, or vice versa, a time switch which is included in the last mentioned circuit and is adapted to open the same automatically and thereby effect release of the brake after the expiration of a short period of time from the instant of application thereof, start, stop, inch and retain switches, and means enabling said switches to be operated as required at the will of the attendant of the machine and according as to whether the machine is to be started, stopped or inched.

8. In a knitting machine, an electrical starting and stopping arrangement comprising, in combination, an electric driving motor for driving the said machine, a circuit incorporating electrical stop motion devices operation of any one of which, in an emergency, effects the switching off of said motor, a brake operable to bring the machine to a stop when the motor is switched off, means whereby mains current to the said motor is switched on and off, a stop motion relay arranged in circuit with the stop motion devices, a solenoid through the agency of which the brake is both applied and released, a direct system of mechanical connections between the solenoid and the brake, said stop motion relay embodying a changeover element movable from one position to another to make the circuit incorporating the means whereby current to the motor is switched on and off and break the circuit of the aforesaid solenoid, or vice versa, a time switch which is included in the last mentioned circuit and is adapted to open the same automatically and thereby effect release of the brake after the expiration of a short period of time from the instant of application thereof, start, stop, inch and retain switches, and means enabling said switches to be operated as required at the will of the attendant of the machine and according as to whether the machine is to be started, stopped or inched.

9. An electrical starting and stopping arrangement according to claim 8, wherein when the machine is running the time switch is closed, said switch being conditioned to open automatically after a predetermined interval of time whenever the brake is applied by energisation of the brake solenoid, for the purpose described.

10. An electrical starting and stopping arrangement according to claim 8, wherein the means whereby current to the motor is switched on and off consists of a contactor with an operating coil.

11. An electrical starting and stopping arrangement according to claim 10, wherein the time switch is arranged to be automatically closed whenever the motor contactor is closed, and conditioned to open automatically after the required delay whenever the said contactor is permitted to open.

12. An electrical starting and stopping arrangement according to claim 11, wherein the time switch is arranged to be acted upon and opened mechanically by spring-influenced means which are actuated from a moving part of the motor contactor and are controlled by a delaying device, so that whenever the said contactor opens to switch off the current to the motor, simultaneously with application of the brake, the spring-influenced means move to open the time switch under the control exercised by the delaying device.

13. In a knitting machine, an electrical starting and stopping arrangement comprising, in combination, an electric driving motor for driving the said machine, a circuit incorporating electrical stop motion devices operation of any one of which, in an emergency, effects the switching off of said motor, a brake operable to bring the machine to a stop when the motor is switched off, a contactor with an operating coil whereby mains current to the said motor is switched on and off, a stop motion relay arranged in circuit with the stop motion devices, a solenoid through the agency of which the brake is both applied and released, a direct system of mechanical connections between the solenoid and the brake, said stop motion relay embodying a changeover element movable from one position to another to make the circuit incorporating the operating coil of the motor contactor and break the circuit of the aforesaid solenoid, or vice versa, a time switch which is included in the last mentioned circuit and is adapted to open the same automatically and thereby effect release of the brake after the expiration of a short period of time from the instant of application thereof, the time switch being closed when the machine is running and being conditioned to open automatically after a predetermined interval of time whenever the brake is applied by energisation of the brake solenoid, start, stop, inch and retain switches, and means enabling said switches to be operated as required at the will of the attendant of the machine and according as to whether the machine is to be started, stopped or inched.

14. An electrical starting and stopping arrangement according to claim 13, wherein when the operating coil of the motor contactor is energised to close the latter and so re-start the machine after a stoppage, the time switch is as a consequence automatically closed.

15. An electrical starting and stopping arrangement according to claim 13, wherein with the knitting machine running the brake is off, the time switch closed, and the changeover element of the stop motion relay is so positioned that the circuit of the brake solenoid is open and the motor contactor operating coil circuit is closed, but wherein when the stop motion relay is energised, either at the will of the operator by actuation of the stop switch, or automatically upon operation of any one of the electrical stop motion devices, the changeover element moves into its alternative position with the result that (a) the circuit of the operating coil is broken to release the contactor which thereupon opens to switch off the current to the motor and (b) the circuit of the brake solenoid is closed to apply the brake and condition the time switch to open automatically after the aforementioned predetermined interval of time.

16. An electrical starting and stopping arrangement according to claim 13, wherein actuation of the start switch to start up or re-start the knitting machine permits of energisation of the motor contactor operating coil and as a consequence also effects movement of a hold-on switch to bridge contacts whereby the connection of the appropriate side of the operating coil with earth, via the retain switch, is maintained so that even when the closed start switch is released and opens, the operating coil circuit remains closed and the motor continues to run.

17. An electrical starting and stopping arrangement according to claim 16, wherein when inching the machine the connection between the appropriate one of the bridged hold-on contacts and earth is broken (by virtue of the retain switch being open) so that when the inch switch is permitted to open closure of the operating coil circuit will not be maintained.

18. In a circular knitting machine having a rotary knitting head supported on a bed plate, an electrical starting and stopping arrangement comprising, in combination, an electric driving motor for driving the said machine, a circuit incorporating electrical stop motion devices operation of any one of which, in an emergency, effects the switching off of said motor, a brake operable to bring the machine to a stop when the motor is switched off, a contactor with an operating coil whereby mains current to the said motor is switched on and off, a stop motion relay arranged in circuit with the stop motion devices, a current-responsive device through the agency of which the brake is both applied and released, said stop motion relay embodying a changeover element movable from one position to another to make the circuit incorporating the operating coil of the motor contactor and break the circuit of the aforesaid current-responsive device, or vice versa, a time switch which is included in the last mentioned circuit and is adapted to open the same automatically and thereby effect release of the brake after expiration of a short period of time from the instant of application thereof, a switch box mounted below the bed plate of the knitting head, start, stop, inch and retain switches mounted in said box, a rod fixed in the switch box, spring-influenced blocks which are slidable along said rod, cams provided on said blocks for action upon the aforementioned switches, a common switch-actuating ring which is mounted for turning movement beneath said bed plate and has a switch control section, and operating cams on said section arranged for action on said blocks whereby the switches can be operated as required by turning the ring in either direction according as to whether the machine is to be started, stopped or inched.

References Cited in the file of this patent

UNITED STATES PATENTS

| | | |
|---|---|---|
| 1,813,163 | Howie | July 7, 1931 |
| 2,540,645 | Berger et al. | Feb. 6, 1951 |
| 2,694,305 | Lafeuillade | Nov. 16, 1954 |